United States Patent [19]

Lucas

[11] 4,154,330
[45] May 15, 1979

[54] DEVICE FOR CENTERING, STRAIGHTENING OR TURNING LOADS DISPLACED BY MOTORIZED CONVEYORS

[76] Inventor: Raymond Lucas, Ave. de la Republique, 33730 Prechac, France

[21] Appl. No.: 801,796

[22] Filed: May 31, 1977

[30] Foreign Application Priority Data

Jul. 9, 1976 [FR] France .................. 76 21015

[51] Int. Cl.² .................. B65G 47/24; B65G 57/00
[52] U.S. Cl. .................. 198/411; 198/434
[58] Field of Search .................. 198/379, 395, 398, 399, 198/401, 411, 422, 434, 456; 271/213, 221, 222; 214/6 S

[56] References Cited

U.S. PATENT DOCUMENTS

| | | | |
|---|---|---|---|
| 1,935,767 | 11/1933 | Delany | 271/222 |
| 2,818,156 | 12/1957 | Edwards | 198/456 |
| 2,827,999 | 3/1958 | Raynor | 198/456 |
| 2,866,535 | 12/1958 | Verrinder et al. | 198/401 |
| 3,089,576 | 5/1963 | Sauer et al. | 198/456 |
| 3,102,627 | 9/1963 | Acton et al. | 198/456 |
| 3,137,286 | 6/1964 | Raynor | 198/422 |
| 3,189,156 | 6/1965 | Hyer et al. | 198/456 |
| 3,250,373 | 5/1966 | Yanoshita | 198/379 |
| 3,256,010 | 6/1966 | Buccicone | 271/222 |
| 3,493,096 | 2/1970 | Antoszewski et al. | 198/399 |
| 3,587,876 | 6/1971 | Dahlem | 198/411 |
| 3,647,092 | 3/1972 | Bulat et al. | 214/6 S |
| 3,732,968 | 5/1973 | Fedor et al. | 198/395 |
| 3,904,045 | 9/1975 | Thibault | 214/6 S |

FOREIGN PATENT DOCUMENTS

| | | | |
|---|---|---|---|
| 2440463 | 3/1976 | Fed. Rep. of Germany | 198/379 |
| 423715 | 9/1974 | U.S.S.R. | 198/456 |

*Primary Examiner*—Joseph E. Valenza
*Attorney, Agent, or Firm*—Schwartz, Jeffery, Schwaab, Mack, Blumenthal & Koch

[57] ABSTRACT

A device for centering, straightening up and turning the loads displaced on a motorized conveyor. The device comprises at least one support which is transverse in relation to the direction of displacement of the load on the conveyor and on which are slidingly mounted two vertical arms capable of being displaced in a transverse direction so as to straighten up and then center the said load in relation to a predetermined axis.

2 Claims, 4 Drawing Figures

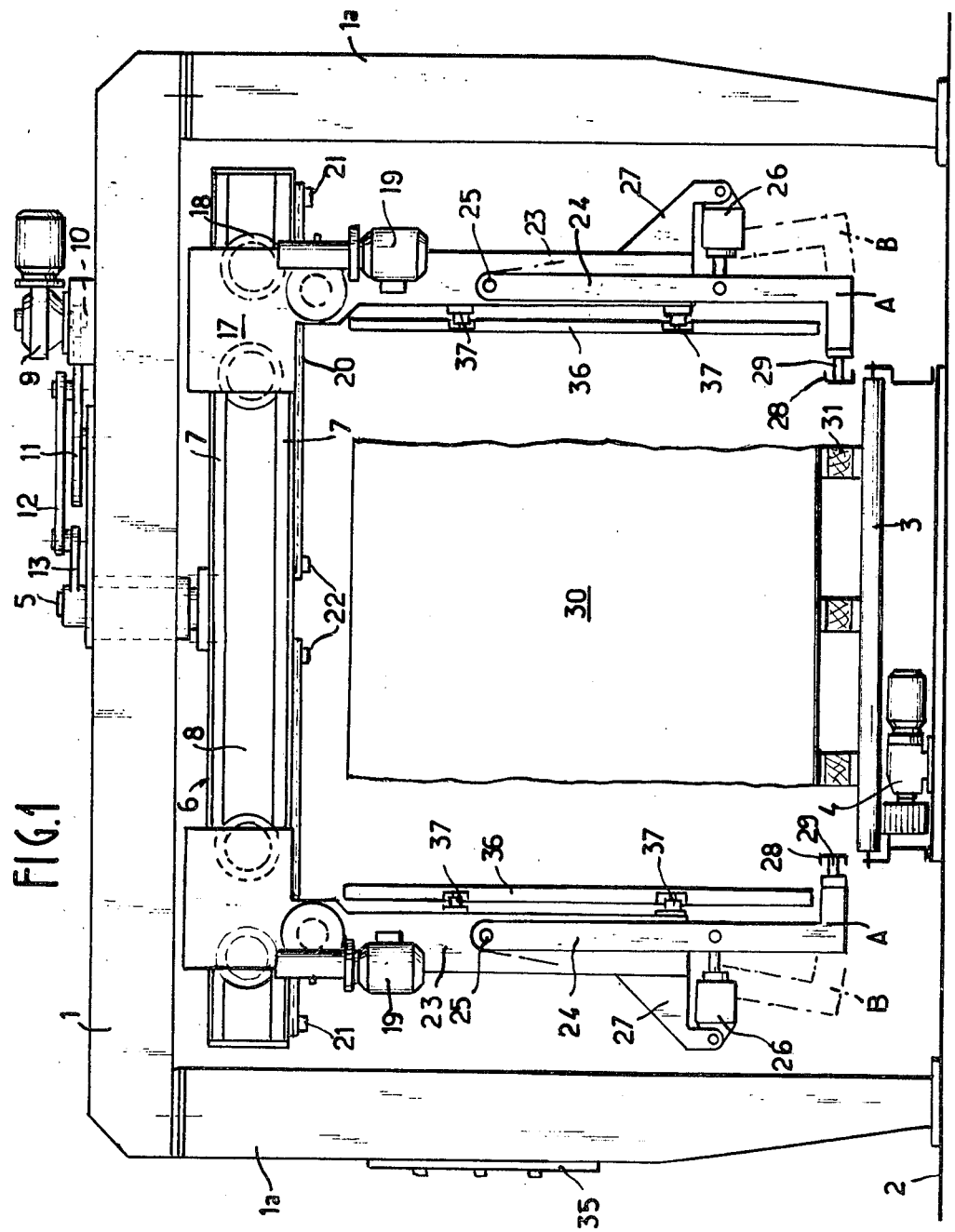

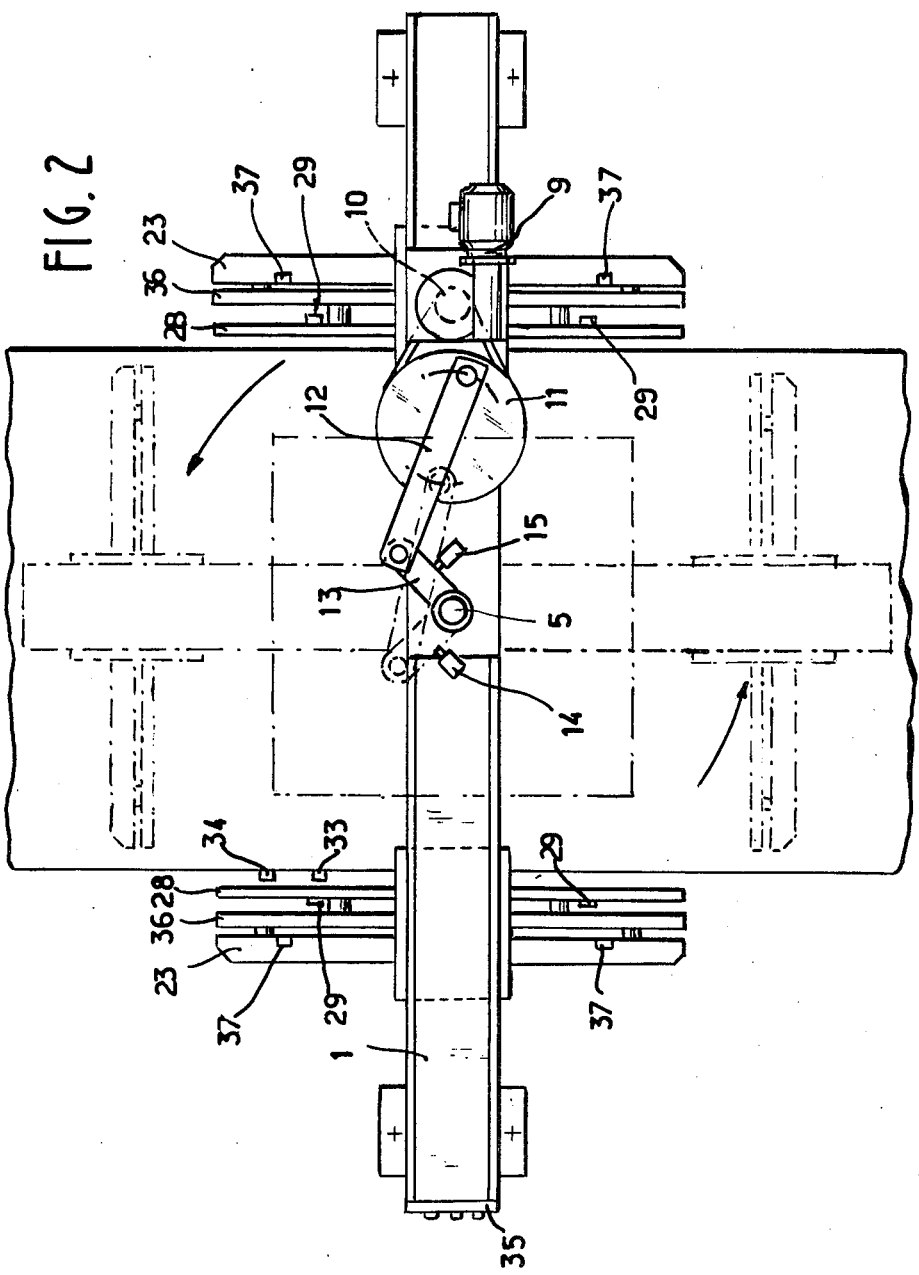

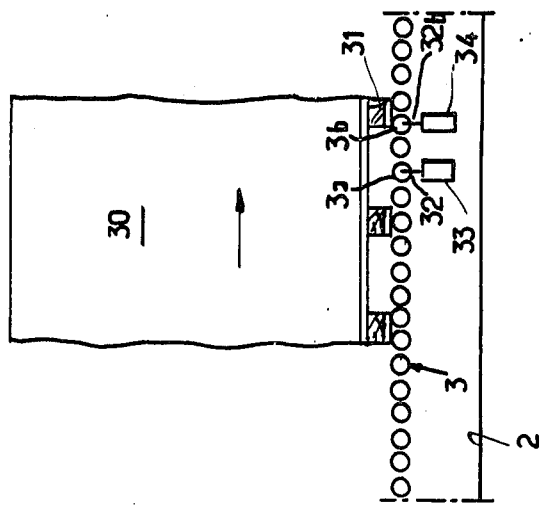
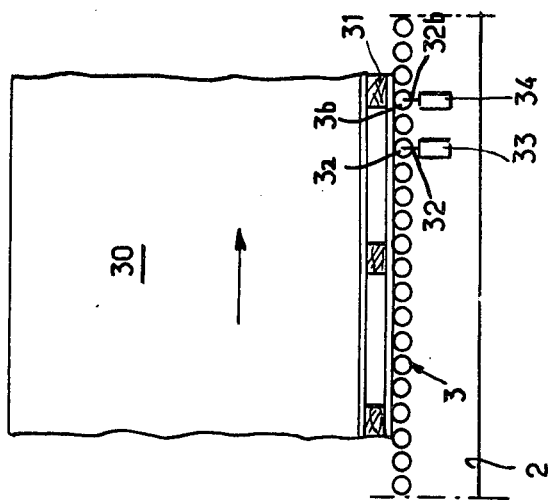

DEVICE FOR CENTERING, STRAIGHTENING OR TURNING LOADS DISPLACED BY MOTORIZED CONVEYORS

BACKGROUND OF THE INVENTION

The present invention relates to a device for centering, straightening up and turning the loads of the motorized converyors such as roller conveyors.

When loads such as pallets are conveyed on the motorized roller conveyors it has been found that these pallets are not always on the axis of movement and/or not always centered in relation to the conveyors. This shifting movement is often the result of the fact that the loads are badly arranged on the conveyors at the moment of loading. Even when they are properly arranged on the conveyors, the pallets are progressively diverted during transportion from one station to the next for a multiplicity of reasons. In the majority of cases, the two causes for the load being carried out of its path in a lateral direction (bad positioning at the outset and lateral diversion) are complementary to each other and in practice it follows that the pallets are never suitably centered.

Depending on the nature of their implementation, stacking in the case of corrugated cardboard sheets, and the different stations where they are processed and/or handled, the pallets may be equally arranged on the conveyor at 90° from each other.

Moreover when, at the end of the conveyor circuit, the pallets have to be encircled for example, by means of automatic machines forming an integral part of the conveyors or are given a covering made of a plastics material and pass across a shrinking furnace, it is absolutely essential that the said pallets should arrive at these different stations perfectly centered, i.e. right in the center of the conveyors, at right angles in relation to the conveyor and if necessary directed in a suitable direction. In fact, in the case of rectangular pallets it is necessary that their length should lie in the direction of movement if it is desired that encircling and/or shrinking of the thermoplastic covering should take place under the best conditions.

There already exist means for effecting the above-mentioned functions. For example, it may be a question of a lift which displaces the pallets and/or turns them round by a certain angle in order to bring them into an adequate position. But all the known apparatus are not automatic in this sense in that they do not carry out the different functions automatically and in a repetitive manner from one load to the next while in general positioning is left to the visual appreciation of the operator of the said apparatus.

SUMMARY OF THE INVENTION

It is an object of the present invention to produce a device which centers, straightens up and/or turns a load automatically and as a function of the conditions which are suited to the conveyor associated thereto.

According to the invention, there is provided a device for straightening, centering and turning round loads being transported on a motorized conveyor, comprising at least one transverse support transverse in relation to the direction of transport of the load on the conveyor and two slidingly mounted vertical arms mounted on said support and capable of being displaced in a transverse direction to straighten and then center a load in relation to a predetermined axis.

BRIEF DESCRIPTION OF THE DRAWINGS

The invention will now be described in greater detail, by way of example, with reference to the drawings in which:

FIG. 1 shows an elevational view of the device in accordance with a preferred embodiment of the invention;

FIG. 2 shows a view of the device shown in FIG. 1 taken from above;

FIG. 3a is a schematic view of the detectors for detection of the direction of the load on the conveyor with a pallet orientated longitudinally, and FIG. 3b is a view similar to FIG. 3a but with a pallet orientated transversely.

DESCRIPTION OF THE PREFERRED EMBODIMENT

In accordance with a preferred embodiment of the invention, a device which centers, straightens up and/or turns a load automatically comprises at least one support which is transverse to the direction of displacement of the load on the conveyor and on which are slidingly mounted two vertical arms which are capable of being displaced in the transverse direction so as to straighten up and then center the said load in relation to a predetermined axis.

The vertical arms are displaced at the same speed in opposite directions and in parallel with the transverse support. A lever arm, at least one part of which is capable of coming to rest against the load to be straightened and centered, is pivotally linked to each of the arms.

In this way, whatever the position of the load on the motorized conveyor, it is ensured that straightening and centering of the load will take place correctly in relation to the chosen axis, this axis not necessarily being the mean longitudinal axis of the conveyor.

The lever arms are pivotally linked at their upper extremity, one in the form of an L, and are provided at their lower front extremity with resiliently mounted jaws, which are associated with dynamometrical elements, and pivoting of each of the lever arms is carried out by means of a pneumatic ram or an hydraulic jack mounted on the corresponding vertical arm.

The result is that the device first of all carries out straightening of the load in order to carry it parallel to the longitudinal edges of the conveyor and then carries out centering in accordance with the chosen axis, the vertical arms continuing their advance up to limit switches at the end of the path.

The transverse support is mounted on a rotary shaft so as to be able to turn the load when the latter is not suitably oriented in relation to the conveyor.

The device moreover comprises means for straightening the load itself in relation to the support pallet.

Referring now to the drawings, the machine is made up of a large and very rigid gantry comprising a cross-piece 1 and vertical supports 1a fixed to the ground (2) by any appropriate means such as bedding and which lies astride a motorized conveyor made up of two rollers 3 driven by a motor 4.

In the geometric upper axis of this gantry or mean vertical plan of the cross-piece 1 is mounted a vertical shaft 5 of the journal or spindle type passing through the gantry and which, in its lower part, carries a transverse support at its center which is made up of a sliding beam 6 provided on its two lateral faces by guide rails 7 delimiting a rollway 8. The beam 6 is pivoted by a motor reducer assembly 9 placed at the upper part of the gantry 1.

The motor reducer 9 (FIG. 2) drives a crank plate 11 by means of a chain gearing and pinions 10, the crank plate 11 driving a lever with a crank lever 13 by means of a connecting rod 12, the crank lever 13 being keyed on the shaft 5 itself integrally with the beam 6. Precise control of angular positioning when rotating the beam 6 is assured by the limit switches 14 and 15 which limit rotation of the beam 6 to ¼ of a turn as this is sufficient in the majority of cases; the electrical limit switches 14 and 15 are mounted on the upper face of the cross-piece 1 and are actuated by the lever 13.

This reduction gear device with connection to the final movement by means of the connecting rod-crank ensures pivoting of the jaws and also ensures very rapid and progressive loading, thanks to the well-known principle of uniform accelerated and slowed down movement which is inherent to this device.

It is obvious that the pivotal movement of this assembly could be carried out differently and by known means (pneumatic rams or hydraulic jacks having linear or angular functions, a variable speed motor etc.).

The jaws could also turn through 360° on their axis which is identical to the shaft 5 instead of 90° without going beyond the framework of the present invention.

Carriages 17, each provided with four flanged rollers 18 mounted on ball bearings are displaced in the rollways 8; the displacement of the carriages is carried out without any play on the beam 6. The two carriages 17 are driven on the beam 6 by the braked reduction geared motor 19 which act by way of the pinions and racks 20 which are integral with the beam 6.

It should be noted that the two carriages are not mechanically but electrically linked. The drive motors having excess power when the two carriages are sent off in one or other direction, their advancing speed is identical and their displacement is symmetrical with respect to the axis of the supporting beams and of the conveyor.

In any case, if a slight shift were produced during a pressing period this would be automatically corrected into a geometric position equidistant from the axis at the end of the period of opening of the jaws thanks to the limit switches 21 at the end of the path which are arranged at one end of the rack 20 or possibly thanks to the limit switches 22 arranged at the other end of the said rack 20 because the electrical control circuit is established such that each carriage must go up to its own limit switches 21 or 22 according to its direction of displacement.

The carriages 17, which are therefore self propelled are lengthened by the vertical hanging arms 23 which carry hanging arms 24 in turn jointed at 25 at their upper end; the said arms 24 being L-shaped in section. The arms 24 oscillate on their axes 25 in order to take up a forward position (A) or a rear position (b) shown in dotted lines on FIG. 1. The change in position is obtained by the compressed air jacks 26 mounted in an appropriate manner on the vertical arms 23 by means of supports 27. As will be apparent from the drawing, the axes 25 of the L-shaped hanging arms 24 are parallel to the conveyor, each L-shaped arm 24 being pivotable in a plane perpendicular to the longitudinal axes of the conveyor, the L-shaped arms 24 having lower legs facing interiorly toward each other, the lower legs having innermost sides.

It is also obvious that in order to ensure simultaneous translation of the two carriages 17, it is possible to use other known mechanical means such as lead screws, synchronised hydraulic rams, etc.

In jacks 26, compressed air at high pressure is maintained in a manner known per se and which has not been described such that the lever arms 24 are always in the front position (A). The lever arms 24 have their base or lower end in the shape of a square one side of which is directed towards the pallet. The lower innermost ends of the lever arms 24 carry the jaws 28 themselves which have a length which is generally larger than the pallet which is to be straightened up and centered and which will grip the pallet as in a vice; but the connection between the lever arms 24 and the jaws 28 is resilient, i.e. it is made up by force responsive elements 29 having adjustable springs which are compressed under the pre-controlled effort. These force responsive elements 29 made up of calibrated springs, the calibration of which may be controlled manually by a button, are connected to electrical contacts not shown which stop advancement of the carriages 17 when the pressing effort desired is obtained.

Just as will be explained in greater detail below in the geometrical description of functioning of the machine, there are parallel jaws 28 which will center and square up the pallet by symmetrically pressing it.

In fact, the effort of pushing the jacks 26 is greater than the effort required to make the pallet slide or slip on the rollers and on the other hand the dynamometrical electrical elements are connected electrically in parallel.

Functioning of the device described above is as follows:

When a load 30 arranged for example on a pallet 31 of the open type is displaced on the motorized conveyor 3 and arrives uncentered and unsquared below the device, the latter is automatically actuated by control elements not shown but known per se. The expression "load" as used herein may refer either to the combination of the load itself 30 and pallet 31, or to the load itself 30. It is believed that the precise meaning in each instance will be apparent from the context.

As soon as these control elements are actuated, the roller conveyor 3 is stopped and the jaw 28 draw together at the same speed and symmetrically of the chosen centering axis. When the first of the jaw 28 touches the pallet 31, it begins to straighten the pallet 31 and push it by making it slide or slip on the rollers 3 until the second jaw 28 opposite it in turn comes into contact with the other side of the pallet 31. As the jaws 28 are very rigid and non-deformable mechanically, i.e. they always remain parallel to the longitudinal axis of the conveyor which may be identical to the axis of centering selected and may be in the same plane, it is understood that when one jaw 28 touches the side of a pallet not parallel to this axis or badly centered, i.e. closer to one side of the conveyor, straightening is effected automatically because the pallet 31 slips angularly until the jaws push against the pallet 31 with all of its length. In fact, the force responsive elements 29 associated with jaws 28 which are mounted on the said jaws symmetrically in relation to the gantry 1 or to the beam 6, it follows that at the contact with the pallet 31 the force responsive element situated closest to the contact area is driven in so as to bring the jaws 28 slightly at an angle in relation to the selected axis of centering. When the entire length of the jaw 28 is in contact with the pallet 31, then the latter is straightened, i.e. it is located parallel to the selected centering axis. The carriage 17 for carrying the jaws 28 continue their displacement until the force responsive elements 29 have all been driven in. Consequently, the carriages 17 stop immediately in a precise manner and remain in this position because the reduction motors of the said carriages 17 are braked motor. Thus the functions of straightening and centering are terminated and if no other function has been foreseen in the sequence, the jaws 28 move aside simultaneously in order to permit the load 30 to be displaced and evacuated out of the device after the conveyor 5 has again been set into motion.

When the pallet 31 is brought under the device badly directed or badly oriented, for example its length is perpendicular to the selected centering axis, it is necessary therefore to turn it through an angle of 90° in order to bring it into a suitable direction. For this and, for the example, of rectangular pallets 31 and of the open type, i.e. having a bottom made up solely of two or three parallel skis or skates leaving a space free between the skates, the device is provided with means for detecting the orientation. These means (FIG. 3) consist in slightly raising a first roller 3a on the one hand by means of a spring 32 associated with an electrical contact 33 and, on the other hand, raising a second roller 3b by means of a spring 32b associated with an electrical contact 34 identical to the electrical contact 33. Consequently when a pallet of the open type moves on the conveyor 3 with its long skates (FIG. 3a) the two electrical contacts 33 and 34 are driven in almost at the same time and electrical pulses emitted by the electrical contacts 33 and 34 being produced together, pivoting of the pallet 31 is not controlled. When a pallet 31 moves on the conveyor 3 (FIG. 3b) with its skates parallel to the generatrices of the rollers of the conveyor, the first contact 33 is actuated and then it is the turn of the contact 34 to be actuated, the contact 33 having been released as soon as the skate left it. This interval of time, makes it possible, by means of electrical relays not shown, to control the rotation of the load 30 and of the pallet 31 in order to bring them into a suitable direction. It is obvious that the spacing between contacts 33 and 34 is lower than that existing between two successive skates of the pallet 31.

When the turn around function of the load 30 is necessary as well as the functions of straightening up and centering already described above the device operates in the following manner so as to provide an additional work cycle and time. The jaws 28 being moved aside from each other, the beam 6 is turned by a quarter of a turn or by the appropriate angle so as to bring the said jaws, for example, into the new position shown in dotted lines on FIG. 2. In this new position the jaws 28 approach each other so as to carry out the functions of straightening up and centering. When the latter functions have been terminated the beam 6 is turned as previously about the vertical shaft 5 by an appropriate angle, for example 90°, in order to bring the jaws 28 into their initial position. After which the jaws 28 are moved aside and the device is ready to receive a new load.

In addition to the necessity of centering, straightening up and turning the pallets on a conveyor, it may be extremely useful to be able to straighten up the load 30 as located on the pallet at the same time.

In fact, during the course of different manipulations and conveying, the loads placed on the pallets may be deformed and this is annoying both in terms of presentation and in terms of the resultant additional burden.

The device in accordance with the invention may in many cases solve this problem. In particular when it is a question of stacking products which do not stick together too much, or a question of cardboard packing, for example.

In this case the functioning of the device will be as follows:

After centering, straightening and even turning of the pallet 31, if necessary, has been carried out as explained above and before bringing the jaws 28 into their initial open position the carriages 17 being stopped by the force responsive elements 29, different functions are set on the electrical control panel 35, these functions being to effect a function "straightening up the stack." The force responsive contacts 29 make the air pressure in the jacks 26 drop as a result of the appropriate reducing valves not shown but known per se.

At this moment the two carriages 17 resume (or continue) their advance towards the chosen centering axis, the lever arms 24 pivoting about their axis 25, in order to take up the rear position (B).

On the other hand large rigid plates 36 higher and wider than the larger blades, the plates 36 each being fixed in a resilient manner of the arm 23 by means of force responsive elements 37, are fixed on each side on to the hanging arms 23 which are integral with the carriages 17. In these conditions, while the carriages 17 continue their advance, the first plate 36 which will meet the irregularly loaded pallet will push it, square it up and straighten it.

The two carriages 17 will continue their movement until the two plates 36 are in contact with and under pressure from the load according to the same principle as for the straightening jaws 28 described above.

With this additional function, the carriages 17 stop definitively when all of the force responsive elements 29 and 37 have been driven in.

If it is desired to straighten the two other sides of the blade it will be sufficient to make the machine carry out a quarter-turn and to carry out the same pressing function.

It is clear that all of the functions of the machine may be carried out at command and manually controlled or may happen in sequence according to an automatic cycle which has been predetermined in advance.

Often the effort necessary to straighten the products which are on the pallet 31 may be greater than the adhesion of the said pallet on the rollers of the conveyor. In this case when straightening the load 30, there is the risk of placing the pallet 31 itself crosswise. It is for this reason that the device in accordance with the invention is provided such that the pallet 31 is firmly maintained by the jaws 28 thanks to a certain air pressure (controllable) maintained in the jacks 26 at the time of the last advance phase of the plates 36 for equalizing the load 30.

Similarly it is often the case that the load 30 of the pallets is not perfectly centered in relation to the pallet itself.

The loads may also extend beyond the pallets. Sometimes but more rarely, the loads have a dimension which is less than the pallets.

In any case the device according to the invention rectifies the geometry of the entire pallet 31 and of the load 30 optimally as a result of the fact that the succession of the phases of operation is carried out logically and progressively.

The presence of the dynamometrical pick-ups limiting the effect as well as maintenance of the blade by the pneumatically moved arms limits the constraints on pallets of low quality to the maximum and does not take the risk of the fragile loads to be straightened deteriorating.

Finally, before and/or after the device according to the invention, the conveyor may be equipped with waiting areas where the loads 30 arranged on their pallets 31 will wait a certain amount of time before being again transported. This may be carried out simply by providing identical elements to the springs 32 and electrical contacts 33 and 34 which may send pulses to the general electrical control circuit in order to actuate timers or other equivalent elements for instantaneously stopping the drive of the conveyor 3.

It will be understood that the above description of the present invention is susceptible to various modification changes and adaptations.

What is claimed is:

1. A device for centering, straightening and turning loads on a motorized conveyor having a longitudinal axis, each load including a load itself and a support therefor, the device comprising:
   (a) a gantry straddling the conveyor, the gantry having a pair of spaced vertical supports and a cross piece;
   (b) a vertical shaft journaled in said cross piece; said vertical shaft having upper and lower parts;
   (c) a transverse support centrally mounted on said lower part of said vertical shaft, said transverse support being disposed above the conveyor, said transverse support including rails defining a rollway along said support;
   (d) motor means on said gantry for pivotally driving said vertical shaft to effect angular displacement of said cross piece;
   (e) means cooperating with said motor means for controlling the angular positioning of said transverse support;
   (f) a pair of carriages displaceably mounted on spaced relation in said rollway;
   (g) means for driving said carriage in said rollway at substantially identical speeds in symmetrical relationship with respect to the conveyor;
   (h) each carriage having a vertical arm depending therefrom;
   (i) each vertical arm including an L-shaped arm pivotally mounted thereon for movement about an axis which is parallel to the conveyor, each L-shaped arm being pivotable in a plane perpendicular to the longitudinal axis of the conveyor, the L-shaped arms having lower legs facing interiorly toward each other, the lower legs having innermost sides;
   (j) the innermost side of each lower leg including a movable jaw thereon for engaging the load support; each movable jaw including force responsive means coupled therewith;
   (k) means coupled between said force responsive means and said driving means for stopping advancing of said carriages inwardly toward said load in response to a predetermined pallet gripping force on said force responsive means;
   (l) means for detecting severe angular misalignment of the load, whereby, in response to a signal from said detecting means, said motor means may be actuated to angularly displace said transverse support into alignment with the load, whereupon the load support is gripped by said jaws and said moving means and the motor means again actuated to pivotally move said load into alignment on the conveyor.

2. A device as defined in claim 1 including interiorly facing plates mounted on each depending vertical arm above said lower legs of said L-shaped arms, said plates being positioned for engagement with the load itself, each plate having second force responsive means coupled therewith, said second force responsive means being operatively coupled with said driving means for said carriage for effecting a predetermined gripping force of said plates on said load itself.

* * * * *